US012703421B2

(12) United States Patent
Jeon

(10) Patent No.: US 12,703,421 B2
(45) Date of Patent: Aug. 11, 2026

(54) STEERING DEVICE OF VEHICLE

(71) Applicant: HL MANDO Corporation, Pyeongtaek (KR)

(72) Inventor: In Hwan Jeon, Seongnam (KR)

(73) Assignee: HL MANDO CORPORATION, Pyeongtaek (KR)

( * ) Notice: Subject to any disclaimer, the term of this patent is extended or adjusted under 35 U.S.C. 154(b) by 857 days.

(21) Appl. No.: 18/157,171

(22) Filed: Jan. 20, 2023

(65) Prior Publication Data

US 2024/0132145 A1 Apr. 25, 2024
US 2024/0227921 A9 Jul. 11, 2024

(30) Foreign Application Priority Data

Jan. 25, 2022 (KR) ........................ 10-2022-0010581

(51) Int. Cl.
*B62D 5/04* (2006.01)

(52) U.S. Cl.
CPC ......... *B62D 5/0448* (2013.01); *B62D 5/0481* (2013.01)

(58) Field of Classification Search
CPC ...... B62D 5/0448; B62D 5/0481; B62D 5/04; B62D 5/0424; B62D 5/0403; B62D 15/0225; F16H 25/22; F16H 25/2204; F16H 25/24; F16H 2025/2096
See application file for complete search history.

(56) References Cited

U.S. PATENT DOCUMENTS 6,691,819 B2 * 2/2004 Menjak .................. B62D 6/003 701/41
2006/0278466 A1 * 12/2006 Cheng .................... B62D 5/046 180/444
2013/0118289 A1 * 5/2013 Yamanaka ........... B62D 5/0448 74/492
2015/0298722 A1 * 10/2015 Witte ................... B62D 5/0421 180/407
2018/0251150 A1 * 9/2018 Ognibene ............ B62D 5/0448
2018/0354548 A1 * 12/2018 Eickholt ................... F16H 7/02
2021/0387667 A1 * 12/2021 Ishihara ............... B62D 5/0448
2022/0063705 A1 * 3/2022 Yasuda .................. B23K 20/12

FOREIGN PATENT DOCUMENTS

JP 2012-166745 A 9/2012
JP 2021-035820 A 3/2021
KR 10-2007-0092710 A 9/2007
KR 10-2020-0144973 A 12/2020
KR 10-2013-0048837 A 5/2023

OTHER PUBLICATIONS

Office Action From Korean Patent Office Dated Mar. 31, 2026 Issued for Corresponding Korean Patent Application.

* cited by examiner

*Primary Examiner* — James A English
(74) *Attorney, Agent, or Firm* — Harvest IP Law, LLP

(57) ABSTRACT

The present embodiments allow for stability and reliability, enhanced responsiveness and output performance, reduced noise, a better steering feeling, and component and cost savings.

10 Claims, 6 Drawing Sheets

FIG. 1
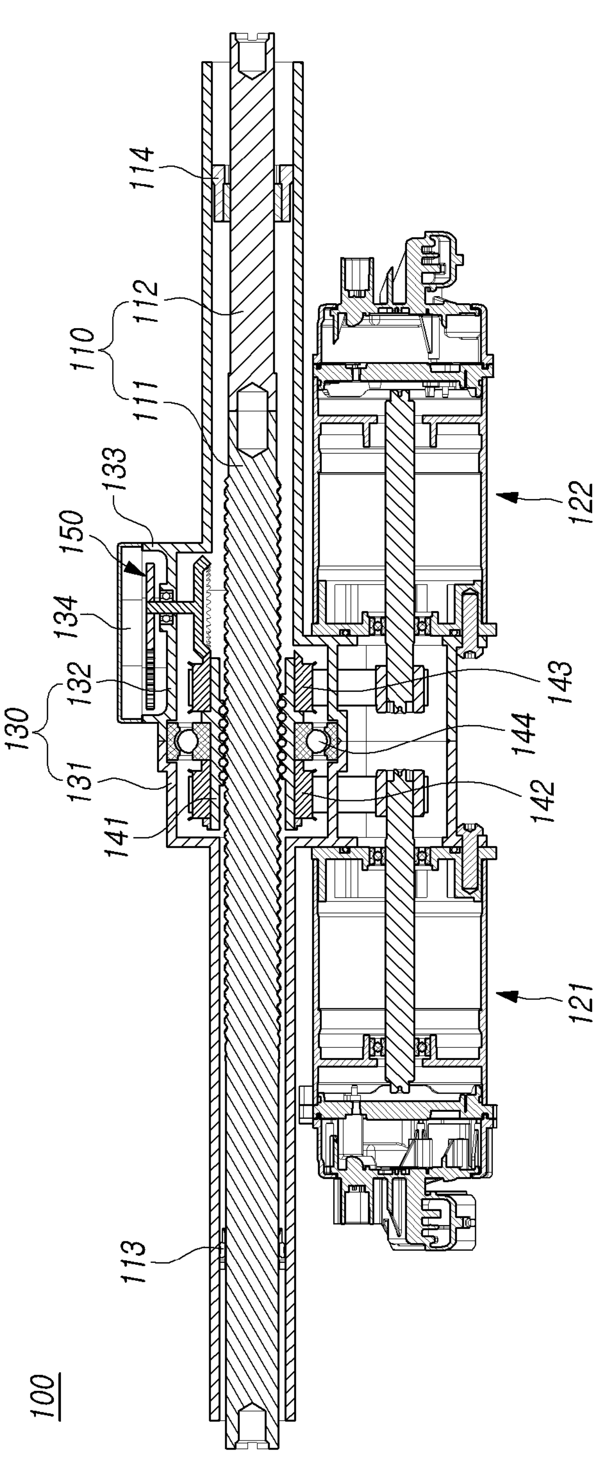

STEERING DEVICE OF VEHICLE

CROSS-REFERENCE TO RELATED APPLICATION

This application claims priority from Korean Patent Application No. 10-2022-0010581, filed on Jan. 25, 2022, which is hereby incorporated by reference for all purposes as if fully set forth herein.

BACKGROUND

Field

The present embodiments relate to a steering device of a vehicle and, more specifically, to a steering device of a vehicle, with stability and reliability, enhanced responsiveness and output performance, reduced noise, a better steering feeling, and component and cost savings.

Description of Related Art

A steering wheel is installed in front of the driver's seat of the vehicle. A steering shaft is connected to the rotational shaft of the steering wheel. A steering system is provided in which as the driver turns the steering wheel to rotate the rotational shaft of the steering wheel, the steering shaft is rotated, and the front wheels of the vehicle are rotated left or right, turning the driving direction of the vehicle.

Further, a power-assisted steering device is often used to assist the driver in steering by driving a motor according to the driving conditions of the vehicle, detected by, e.g., a vehicle velocity sensor and a torque sensor. Generally, such a power-assisted steering device provides a light, convenient steering feel during low-speed driving and a heavy steering feel and a good directing stability during high-speed driving. Further, the power-assisted steering device provides a restorative force to the steering wheel quickly according to the rotational angle of the steering wheel, allowing for rapid steering in an emergency.

Recently, various efforts are being made to reinforce steering stability of autonomous vehicles, with the goal of fully automated driving. However, it is difficult to secure driving stability due to lack of a separate means capable of replacing or assisting an abnormal or faulty mechanism in implementing autonomous driving using a conventional power-assisted steering device.

BRIEF SUMMARY

The present embodiments have been conceived in the foregoing background and relate to a steering device of a vehicle, with stability and reliability, enhanced responsiveness and output performance, reduced noise, a better steering feeling, and component and cost savings.

According to the present embodiments, there may be provided a steering device of a vehicle, comprising a screw shaft having two opposite ends connected to wheels and provided to be axially movable in a housing, a ball nut engaged with the screw shaft, a first nut pulley and a second nut pulley coupled to the ball nut, a first motor for applying torque to the ball nut through the first nut pulley, and a second motor for applying torque to the ball nut through the second nut pulley.

The present embodiments allow for stability and reliability, enhanced responsiveness and output performance, reduced noise, a better steering feeling, and component and cost savings.

DESCRIPTION OF DRAWINGS

The above and other objects, features, and advantages of the disclosure will be more clearly understood from the following detailed description, taken in conjunction with the accompanying drawings, in which:

FIG. 1 is a cross-sectional view illustrating a steering device of a vehicle according to the present embodiments;

DETAILED DESCRIPTION

Figure 2:
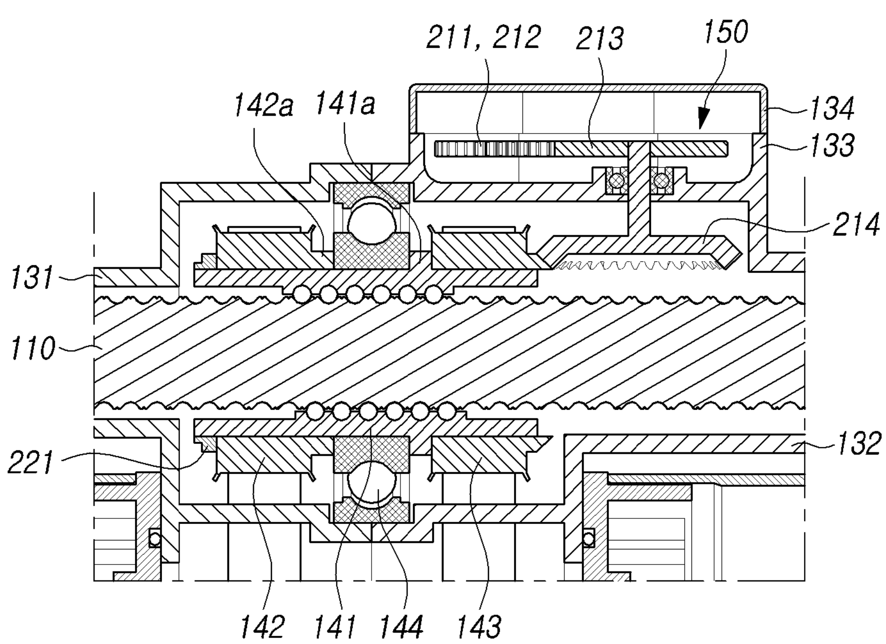
FIG. 2 is an enlarged view of a portion of FIG. 1.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

Figure 3:
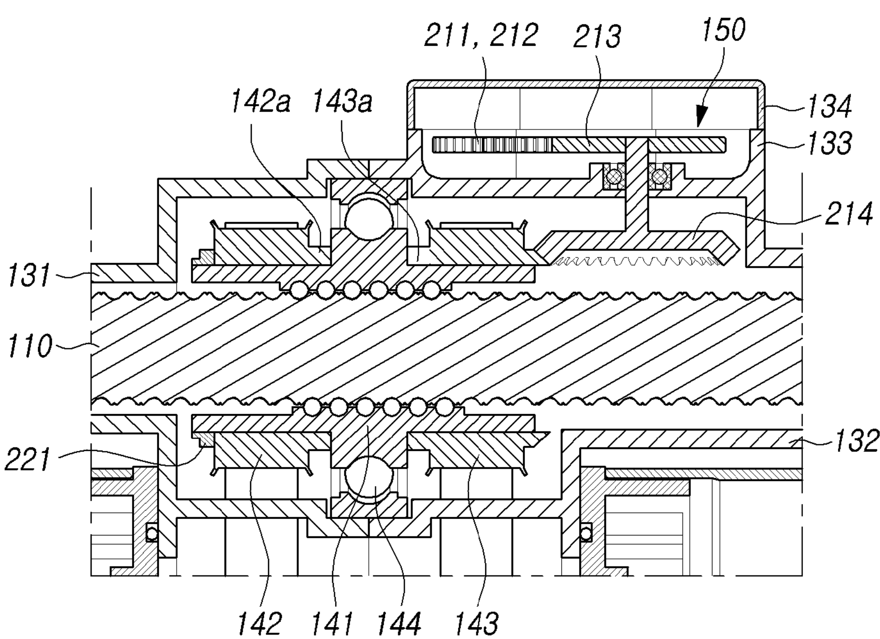
FIG. 3 is a cross-sectional view illustrating a portion of a steering device of a vehicle according to the present embodiments.
Figure 4:
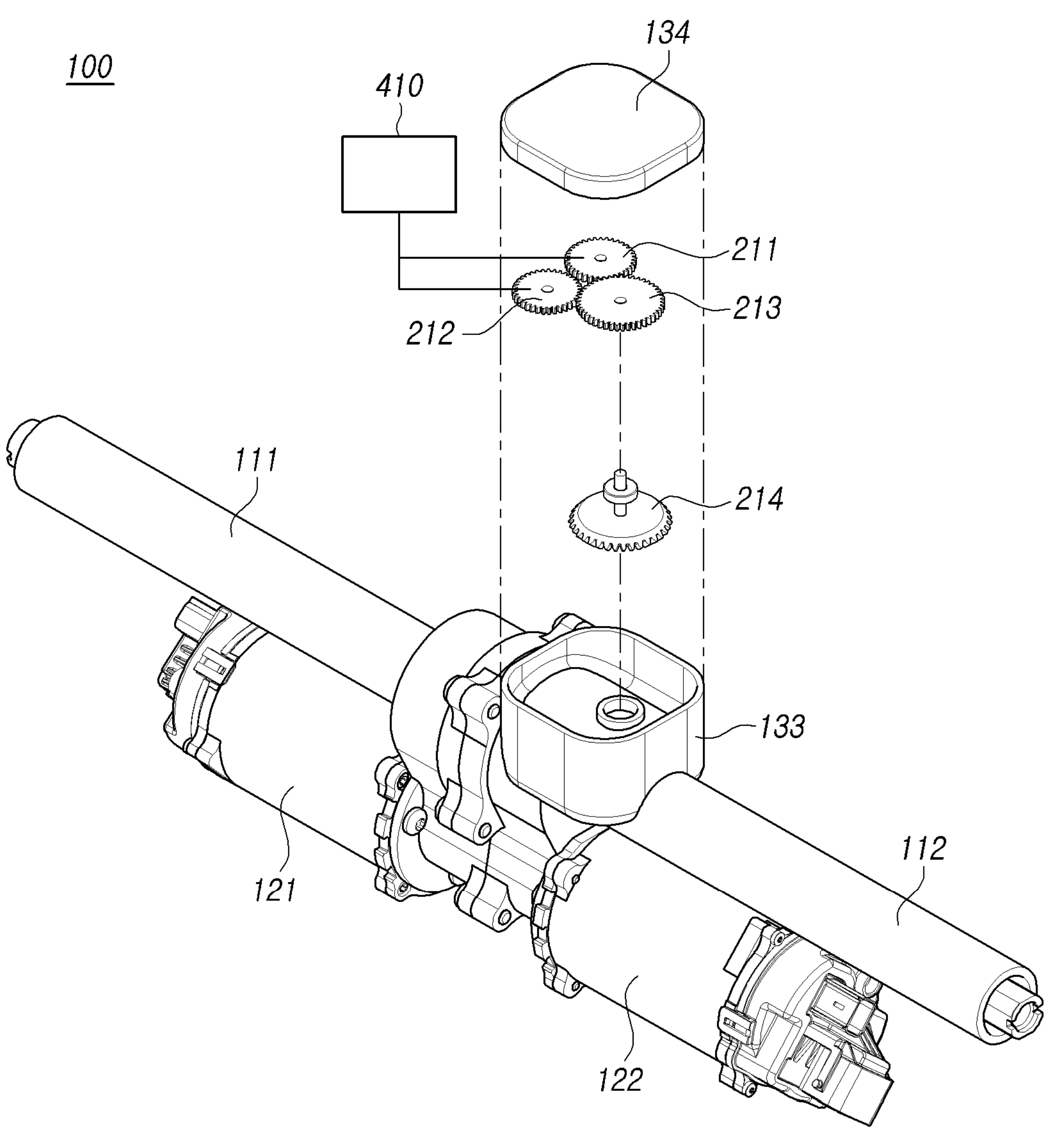
FIG. 4 is an exploded perspective view illustrating a steering device of a vehicle according to the present embodiments.
Figure 5:
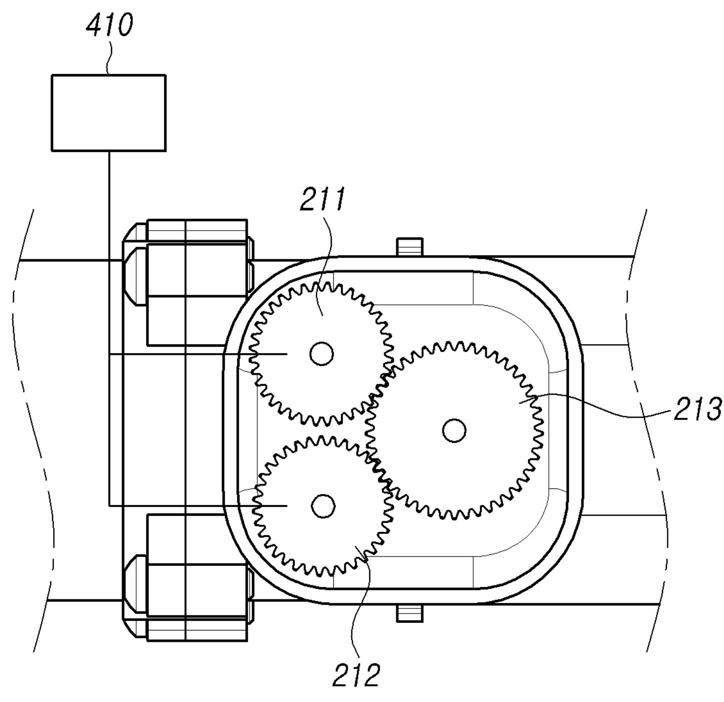
FIG. 5 is a plan view illustrating a portion of a steering device of a vehicle according to the present embodiments.
Figure 6:
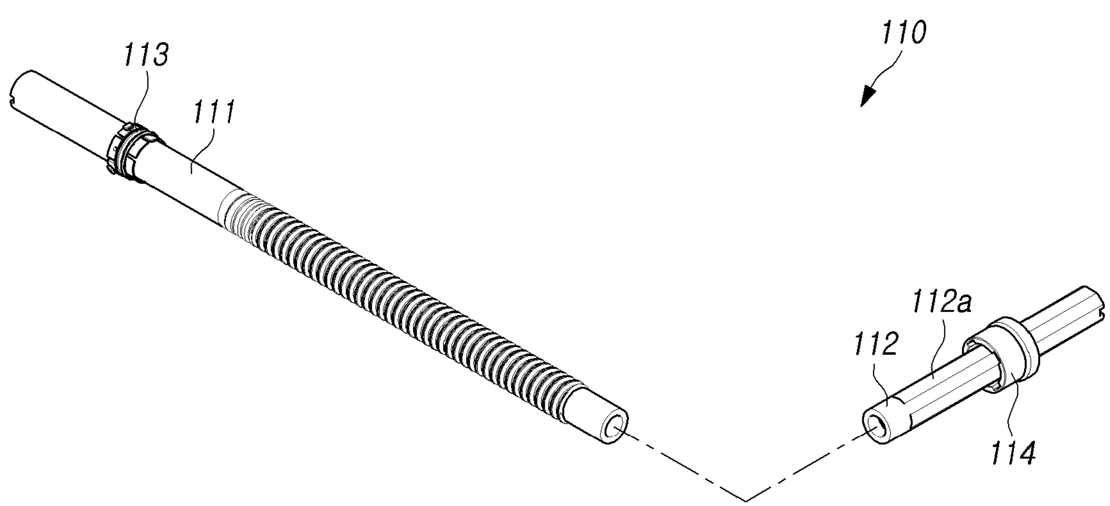
FIG. 6 is a perspective view illustrating a portion of a steering device of a vehicle according to the present embodiments.

FIG. 1 is a cross-sectional view illustrating a steering device of a vehicle according to the present embodiments. FIG. 2 is an enlarged view of a portion of FIG. 1. FIG. 3 is a cross-sectional view illustrating a portion of a steering device of a vehicle according to the present embodiments. FIG. 4 is an exploded perspective view illustrating a steering device of a vehicle according to the present embodiments. FIG. 5 is a plan view illustrating a portion of a steering device of a vehicle according to the present embodiments. FIG. 6 is a perspective view illustrating a portion of a steering device of a vehicle according to the present embodiments.

According to the present embodiments, a steering device 100 of a vehicle comprises a screw shaft 110 having two opposite ends connected to wheels and provided to be axially movable in a housing 130, a ball nut 141 engaged with the screw shaft 110, a first nut pulley 142 and a second nut pulley 143 coupled to the ball nut 141, a first motor 121 for applying torque to the ball nut 141 through the first nut pulley 142, and a second motor 122 for applying torque to the ball nut 141 through the second nut pulley 143.

Referring to FIG. 1, the screw shaft 110 is moved axially within the housing 130 by the torque of the first motor 121 and/or the second motor 122. Although not shown in the drawings, two opposite ends of the screw shaft 110 may be connected to the wheels by, e.g., knuckles and tie rods, and the wheels are steered as the screw shaft 110 moves axially. The axial movement of the screw shaft 110 is supported on the housing 130 by the bushings 113 and 114 (see FIG. 6). The vehicle steering device 100 according to the present embodiments may function as a steer-by-wire type steering device.

The torque of the first motor 121 and the torque of the second motor 122 may be axially converted by the ball nut 141 and applied to the screw shaft 110. In other words, the torque of the first motor 121 and the torque of the second motor 122 are applied to the ball nut 141 engaged with the screw shaft 110 and, as the ball nut 141 rotates, the screw shaft 110 is moved axially. Since the power of the motor is transferred to the screw shaft 110 through the ball nut 141, high responsiveness may be secured.

Motor pulleys are provided on the motor shafts of the first motor 121 and the second motor 122, and each motor pulley is connected to the first nut pulley 142 and the second nut pulley 143 by a belt. In other words, the first motor 121 and the second motor 122 together may provide torque to the ball nut 141. Alternatively, only one of the first motor 121 and the second motor 122 may provide torque to the ball nut 141. In other words, the first motor 121 and the second motor 122 together may be driven, securing high output performance. Alternatively, when the power of one of the first motor 121 and the second motor 122 cannot be transferred to the screw shaft 110, the other one may transfer power to the screw shaft 110. For example, even when the power of the first motor 121 is not transferred to the screw shaft due to issues, such as motor or power pack failure or belt breakage, the second motor 122 continuously transfers power to the screw shaft 110, so that the steering function or steering assist function is not lost. Thus, steering stability and reliability are secured.

The structure of the vehicle steering device 100 according to the present embodiments is described below in greater detail with reference to FIG. 2. The first nut pulley 142 and the second nut pulley 143 are coupled to the outer circumferential surface of the ball nut 141. A bearing 144 for supporting rotation of the ball nut 141 on the housing 130 is provided between the first nut pulley 142 and the second nut pulley 143. In other words, the first nut pulley 142 and the second nut pulley 143, respectively, are symmetrically positioned on two opposite sides of the bearing 144. Therefore, the torques of the first motor 121 and the second motor 122 are applied to the ball nut 141 in a balanced manner, and the bearing 144 supports the center portion of the ball nut 141, reducing the noise caused when the ball nut 141 rotates and hence enhancing steering feel.

The vehicle steering device 100 according to the present embodiments includes a sensing unit 150 for sensing the rotational angle of the ball nut 141. The sensing unit 150 includes a first gear 211, a second gear 212, a third gear 213, and a fourth gear 214, the detailed structure of which is described below.

Referring to the embodiment shown in FIG. 2, a stepped portion **141*a* protrudes from the outer circumferential surface of the ball nut 141 so that the inner ring of the bearing 144 may be supported. The first nut pulley 142 may be provided with an extension 142*a* that extends axially and is supported on the inner ring of the bearing 144. A lock nut 221 may be coupled to the ball nut 141, and the first nut pulley 142 and the inner ring of the bearing 144 may be axially fixed between a lock nut 221 and the stepped portion 141*a*. The second nut pulley 143 may be supported by the stepped portion 141*a* on the opposite side of the bearing 144 and be supported on the third gear 213 and fixed axially. In other words, the second nut pulley 143 may have gear teeth engaged with the third gear 213**.

Referring to the embodiment shown in FIG. 3, the inner ring of the bearing 144 may be integrally formed with the ball nut 141. The first nut pulley 142 and the second nut pulley 143, respectively, may be provided with extensions **142*a* and 143*a* that extend axially and are supported on the inner ring of the bearing 144. The first nut pulley 142 may be axially fixed between the lock nut 221 and the inner ring of the bearing 144. The second nut pulley 143 may be axially fixed between the inner ring of the bearing 144 and the third gear 213**.

Meanwhile, the housing 130 may include a first housing 131 supported on the outer ring of the bearing 144 on one side in the axial direction and a second housing 132 supported on the outer ring of the bearing 144 on the other side in the axial direction. In other words, the first housing 131 and the second housing 132, respectively, are positioned on two opposite sides of the bearing 144 in the axial direction and, as the first housing 131 and the second housing 132 are coupled to each other (e.g., by bolting), the bearing 144 is coupled to the housing 130. Therefore, the need for adding a component (e.g., a lock screw or a support ring) for coupling the bearing 144 to the housing 130 is eliminated, reducing components and hence saving costs.

As shown in FIGS. 1 to 3, the vehicle steering device 100 according to the present embodiments further includes a sensing unit 150 for sensing the rotational angle of the ball nut 141. The electronic control unit provided in the vehicle may derive the axial moving distance of the screw shaft 110 from the rotational angle of the ball nut 141 sensed by the sensing unit 150.

A configuration of the sensing unit 150 is described in more detail with reference to FIGS. 4 and 5. The sensing unit 150 may include a first gear 211 and a second gear 212 rotated in conjunction with rotation of the ball nut 141 and a sensor 410 sensing the rotational angles of the first gear 211 and the second gear 212. As the ball nut 141 rotates, the first gear 211 and the second gear 212 may be rotated and, as the sensor 410 senses the rotational angle of each of the first gear 211 and the second gear 212, the sensing unit 150 may sense the rotational angle of the ball nut 141.

The first gear 211 and the second gear 212 have different diameters. In other words, the first gear 211 and the second gear 212 have different numbers of gear teeth. The drawings illustrate an embodiment in which the first gear 211 has 36 gear teeth, and the second gear 212 has 35 gear teeth. As the first gear 211 and the second gear 212 have different diameters, when the ball nut 141 rotates, the first gear 211 and the second gear 212 may be rotated at different angles, and the electronic control unit may derive the rotational angle of the ball nut 141 from the different rotational angles of the first gear 211 and the second gear 212.

A structure in which the first gear 211 and the second gear 212 are rotated by rotation of the ball nut 141 is described in greater detail. The sensing unit 150 may further include a third gear 213 that is rotated in conjunction with rotation of any one of the first nut pulley 142 and the second nut pulley 143. The first gear 211 and the second gear 212 may be engaged with the third gear 213. The drawings illustrate an embodiment in which the third gear 213 rotates in conjunction with the rotation of the second nut pulley 143. In other words, the first gear 211 and the second gear 212 each are engaged with the third gear 213 and, as the third gear 213 is rotated by the rotation of the second nut pulley 143, the first gear 211 and the second gear 212 are also rotated.

Further, any one of the first nut pulley 142 and the second nut pulley 143 may have gear teeth. The sensing unit 150 may further include a fourth gear 214 engaged with the gear teeth of any one of the first nut pulley 142 and the second nut pulley 143, and the third gear 213 and the fourth gear 214 may be coaxially coupled to each other. The drawings illustrate an embodiment in which the second nut pulley 143 has gear teeth. As shown in FIG. 4, the fourth gear 214 has a shaft and may be coaxially coupled with the third gear 213. The rotation of the fourth gear 214 is supported on the housing 130 by the bearing coupled to the shaft. The second housing 132 may have a receiving portion 133 for receiving the sensing unit 150, and a cover 134 covering the receiving portion 133 may be coupled to the receiving portion 133. Therefore, by the rotation of the ball nut 141, the second nut pulley 143, the fourth gear 214, and the third gear 213 are sequentially connected and rotated, and the first gear 211 and the second gear 212 engaged with the third gear 213 are rotated. This fourth gear 214 may be a bevel gear.

Next, referring to FIG. 6, the screw shaft 110 may include a first shaft portion 111 having a screw engaged with the ball nut 141 and a second shaft portion 112 having at least one chamfered portion 112*a* formed on the outer circumferential surface thereof. The first shaft portion 111 and the second shaft portion 112 may be integrally formed and, as shown in the drawings, they may be individually formed and then coupled. According to an embodiment, the first shaft portion 111 and the second shaft portion 112 may be coupled by friction welding.

For the screw shaft 110 to move axially, the rotation of the screw shaft 110 should be restricted. To restrict the rotation of the screw shaft 110, a bushing 114 supported by the chamfered portion 112*a* and circumferentially supported by the housing 130 may be coupled to the second shaft portion 112. Bushings 113 and 114, respectively, may be coupled to the first shaft portion 111 and the second shaft portion 112, and the axial movement of the screw shaft 110 is supported on the housing 130 by the bushings 113 and 114. In particular, the bushing 115 coupled to the second shaft portion 112 is supported on the chamfered portion 112*a*, restricting rotation of the screw shaft 110. The drawings illustrate an embodiment in which four chamfered portions 112*a* are formed, and the second shaft portion 112 is shaped substantially as a rectangular bar.

The so-shaped vehicle steering device allows for stability and reliability, enhanced responsiveness and output performance, reduced noise, a better steering feeling, and component and cost savings.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A steering device of a vehicle, comprising:

a screw shaft having two opposite ends connected to wheels and provided to be axially movable in a housing;

a ball nut engaged with the screw shaft;

a first nut pulley and a second nut pulley coupled to the ball nut;

a first motor for applying torque to the ball nut through the first nut pulley;

a second motor for applying torque to the ball nut through the second nut pulley, and a sensing unit for sensing a rotational angle of the ball nut, wherein the sensing unit includes a first gear and a second gear rotated in conjunction with rotation of the ball nut and a sensor sensing a rotational angle of the first gear and the second gear, wherein the sensing unit further includes a third gear rotated in conjunction with rotation of either the first out pulley or the second nut pulley, and wherein the first gear and the second gear are engaged with the third gear, wherein a rotational axis of the first gear is perpendicular to the axial movement of the screw shaft.

2. The steering device of claim 1, wherein a bearing for supporting rotation of the ball nut on the housing is provided between the first nut pulley and the second nut pulley.

3. The steering device of claim 2, wherein an inner ring of the bearing is integrally formed with the ball nut.

4. The steering device of claim 2, wherein the housing includes a first housing supported by an outer ring of the bearing on one axial side and a second housing supported by the outer ring of the bearing on another axial side.

5. The steering device of claim 1, wherein the first gear and the second gear are formed to have different diameters.

6. The steering device of claim 1, wherein either the first nut pulley or the second nut pulley has gear teeth, wherein the sensing unit further includes a fourth gear engaged with the gear teeth, and wherein the third gear and the fourth gear are coaxially coupled to each other.

7. The steering device of claim 6, wherein the fourth gear is a bevel gear.

8. The steering device of claim 1, wherein the screw shaft includes a first shaft portion having a screw engaged with the ball nut and a second shaft portion having at least one chamfered portion formed on an outer circumferential surface.

9. The steering device of claim 8, wherein the first shaft portion and the second shaft portion are coupled by friction welding.

10. The steering device of claim 8, wherein a bushing supported by the chamfered portion and circumferentially supported by the housing is coupled to the second shaft portion.

* * * * *